United States Patent
Cho

(10) Patent No.: US 7,553,344 B2
(45) Date of Patent: Jun. 30, 2009

(54) SHAPED THERMALLY STABLE POLYCRYSTALLINE MATERIAL AND ASSOCIATED METHODS OF MANUFACTURE

(75) Inventor: Hyun Sam Cho, Salt Lake City, UT (US)

(73) Assignee: ADICO, Asia Polydiamond Company, Ltd., Kyungki-do (KR)

( * ) Notice: Subject to any disclaimer, the term of this patent is extended or adjusted under 35 U.S.C. 154(b) by 604 days.

(21) Appl. No.: 11/147,660

(22) Filed: Jun. 7, 2005

(65) Prior Publication Data

US 2006/0272571 A1 Dec. 7, 2006

(51) Int. Cl.
*B24D 3/00* (2006.01)
*B24D 18/00* (2006.01)

(52) U.S. Cl. .............. 51/293; 51/298; 51/303; 51/295; 51/307; 51/308; 51/309; 264/122; 264/125

(58) Field of Classification Search ........... 51/293, 51/298, 303, 295, 307–309; 264/122, 125
See application file for complete search history.

(56) References Cited

U.S. PATENT DOCUMENTS

| | | | |
|---|---|---|---|
| 3,631,638 A | 1/1972 | Yoshikawa et al. | |
| 3,819,814 A | 6/1974 | Pope | |
| 4,078,906 A | 3/1978 | Green | |
| 4,188,194 A | 2/1980 | Corrigan | |
| 4,220,455 A | 9/1980 | St. Pierre et al. | |
| 4,224,380 A | 9/1980 | Bovenkerk et al. | |
| 4,289,503 A | 9/1981 | Corrigan | |
| 4,525,179 A | 6/1985 | Gigl | |
| 4,629,373 A | 12/1986 | Hall | |
| 4,776,861 A | 10/1988 | Frushour | |
| 4,793,828 A | 12/1988 | Burnand | |
| 4,797,241 A | 1/1989 | Peterson et al. | |
| 4,828,582 A | 5/1989 | Frushour | |
| 4,923,490 A | 5/1990 | Johnson et al. | |
| 5,043,120 A | 8/1991 | Corrigan | |
| 5,151,107 A | 9/1992 | Cho et al. | |
| 5,194,071 A | 3/1993 | Corrigan et al. | |
| 5,364,423 A | 11/1994 | Bigelow et al. | |
| 5,453,105 A * | 9/1995 | Middlemiss et al. | 51/307 |
| 5,985,228 A | 11/1999 | Corrigan et al. | |
| 6,179,886 B1 | 1/2001 | Gordeev et al. | |
| 6,605,798 B1 | 8/2003 | Cullen | |
| 6,616,725 B2 | 9/2003 | Cho et al. | |
| 2006/0042172 A1* | 3/2006 | Sung | 51/309 |

FOREIGN PATENT DOCUMENTS

| | | | |
|---|---|---|---|
| JP | 04202490 | * | 7/1992 |
| WO | WO 01/16249 | | 3/2001 |
| WO | WO 02/31078 | | 4/2002 |

OTHER PUBLICATIONS

Agrawal, Dinesh, Dr. et al. Producing Advanced Drill Bit Cutters Using Microwave Technology, GasTIPS, Winter 2002 pp. 34-37.
Radtke, Robert et al. "Faster Drilling, Longer Life: Thermally Stable Diamond Drill Bit Cutters" GasTIPS, Summer 2004, pp. 5-9.

* cited by examiner

*Primary Examiner*—Michael A Marcheschi
(74) *Attorney, Agent, or Firm*—Thorpe North & Western LLP

(57) ABSTRACT

A new industrial thermally stable polycrystalline diamond (TSP) is disclosed and described as a replacement of natural as well as synthetic diamond grit in concrete cutting, grinding, polishing, and surface-set grinding or core bit drilling applications. Conventional diamond is too strong and brittle for self-sharpening and polishing and has a lower thermal stability inferior to the industrial standard for high temperature tool segment bonding. TSP grits can be tailor-made having unique properties as well as an engineered shape of grits over naturally or synthetically produced diamond grits. The TSP grits have a high thermal stability of up to 1200° C. and are self-sharpening. Further, economical production of coarse TSP grit size up to 1-2 mm from 50/60 mesh size in almost any preferred shape such as blocky, round, hexagonal, thin elongated, spherical, needle like, and any desirable tailor-made shaped etc can be realized. The use of a partition member during production of the TSP grits allows for the effective manufacturing of desired shaped grits as compared to laborious and ineffective low yield crushing of TSP material. Advantageously, the process time can also be exceptionally shorter than conventional HPHT processes.

21 Claims, 4 Drawing Sheets

SHAPED THERMALLY STABLE POLYCRYSTALLINE MATERIAL AND ASSOCIATED METHODS OF MANUFACTURE

FIELD OF THE INVENTION

The present invention relates generally to materials for using in grinding, polishing, cutting, and other abrasive applications and methods of making such materials. Accordingly, the present application involves the fields of materials science, chemistry, and abrasives.

BACKGROUND OF THE INVENTION

Current conventional synthetic diamond used in granite cutting, concrete cutting, and polishing applications is typically 40/50 and 50/60 mesh grits. These synthetic diamonds are typically smaller in size than the industry demand and are also irregular in shape. In terms of product quality, the thermal strength is not high enough for the above applications as they are randomly grown from HPHT synthesis from graphite in the presence of metal solvent catalyst. On the other hand, the thermal strength of natural diamond is sufficiently high for such applications; however natural diamond is too strong and brittle such that natural diamond is not self-sharpened through micro-chipping. Rather, natural diamond itself is polished, dulled, and tends to macrofracture instead of cutting the workpiece material. Therefore, a control of both grit sizes and individual grit property (e.g. thermal strength) during the HPHT process is not currently readily available in an industrial diamond industry where larger grits are desirable, e.g., 20/30 and 30/40 mesh over the standard 40/50 and 60/70 mesh grits in saw diamond blade and core drill bit manufacturing industries. Natural diamond is generally available in competition with synthetic diamond materials, although the supply of larger natural diamonds is limited and makes their use economically impractical.

Introduction of synthetic diamond has revolutionized the construction industry over the past four decades with the diamond saws for cutting and grinding stone, concrete, marble, and other hard materials. However, there is a new industry that is currently growing and involves the grinding and polishing of gravel aggregated concrete. This industry is in need of improved diamond tool performances over the conventional saw segment type products made with conventional synthetic diamond or natural diamond. Improvements such as self-cutting/self-sharpening, reduced dull-cutting action, and larger size grits (e.g. 10/20 to 20/30 mesh) over conventional size grits (30/50 mesh) would be a significant contribution to the industry.

Currently available grit suppliers of both natural and synthetic diamond are generally limited in their ability to provide large quantities despite some recent improvements in performance. Even synthetic diamond producers cannot currently handle large quantity (like 20 million carats per year) for the grit sizes of 10/20, 20/30, 30/40 mesh within a viable price range.

A number of efforts have been made in an attempt to provide improved abrasive grits with some degree of success. For example, thermally stable PCD (TSP) has been crushed to obtain fragmented grits. These fragmented grits can be sorted and debris removed to provide a TSP grit. However, these TSP grits are random in shape and tend to have highly irregular surface contours. Further, much of the product is lost during crushing as debris. Further, the step of crushing ultra-hard TSP material is itself a very difficult and expensive process.

Although somewhat successful, efforts to provide commercially useful synthetic grits suffer from a variety of shortcomings that limit their potential use, including materials limitations, cost effectiveness, product quality limits, and process efficiency limitations, among others. As such, abrasive materials capable of use in the gravel aggregate and related industries having larger grit sizes, increased thermal stability, and cost effectiveness, continue to be sought through ongoing research and development efforts.

SUMMARY OF THE INVENTION

Accordingly, the present invention provides materials and methods for production of thermally stable polycrystalline grit which are thermally stable, have a tailored strength with good self-cutting behavior, and a favorable size/shape factor along with substantially no supply limitations.

This invention relates to a shaped thermally stable polycrystalline diamond (TSP) grit that is preferably nonporous sintered and/or cemented diamond-diamond and/or diamond-binder bonded in a medium of thermally stable binder like silicon, titanium, nickel, rhenium, tantalum and their alloys with a small amount of bonding medium like boron, nitride, aluminide, tungsten carbide, CBN, and their carbides or alloys. The shape of product can be produced from an in-situ HPHT synthesis process and can have sizes from nominal 50/60 mesh up to 10/20 mesh grits and/or to 2 to 25 mm shaped forms.

In one aspect of the present invention, the TSP diamond grits can be used in surface set bits or core drill bits. Thus, in one aspect, the TSP diamond grits can be formed having a brazable metal binder such that improved bonding between TSP grits and the tool segment binder can be achieved.

It is an object of the present invention to provide new shaped thermally stable PCD grits that are uniquely designed and optimally sized to replace the current natural or synthetic diamond grits in certain applications.

It is another object of this invention to provide new TSP grits of unique microstructure for extending the service life of various diamond tools (e.g. saw or polishing segments) in the new gravel aggregated concrete cutting/grinding/polishing and related industries.

It is another object of this invention to apply the exceptionally shorter HPHT process times over conventional sintering methods in order to effectively produce and supply new tailor-made quality products having both price and performance advantages over any other conventional products.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
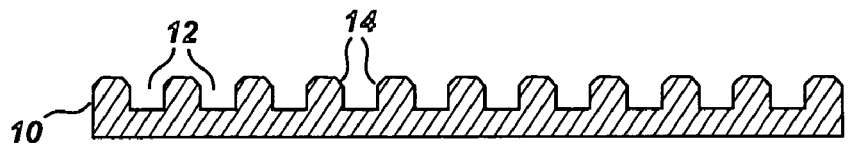
FIG. 1 shows a side cross-sectional view of a partition member in accordance with one embodiment of the present invention.

The drawings will be described further in connection with the following detailed description. Further, these drawings are not necessarily to scale and are by way of illustration only such that dimensions and geometries can vary from those illustrated.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "a layer" includes one or more of such layers, reference to "a grit" includes reference to one or more of such materials, and reference to "an HPHT step" includes reference to one or more of such steps.

Definitions

In describing and claiming the present invention, the following terminology will be used in accordance with the definitions set forth below.

As used herein, "thermally stable polycrystalline material" refers to a material which is bonded together primarily by cementing adjacent particles via a secondary material rather than by sintering. Although a minor amount of sintering can occur, the dominant bonding mechanism occurs via a secondary material such as the binder agent, e.g., Si, Ti, and/or bonding medium such as B, cBN, etc. Further, thermally stable grits are capable of withstanding temperatures from above about 800° C. up to about 1200° C. without back-conversion of diamond to graphite. This is in contrast to conventional polycrystalline diamond cutters (PDC) which are stable only up to about 700° C. at which temperature the PDC begins to degrade in performance and integrity.

As used herein, "inorganic binder agent" refers to a material which acts to bind superabrasive particles of diamond and/or bonding medium such as cBN together. The binder agent can typically form covalent bonds; however, some mechanical bonding can also be present. Although other materials can be suitable, silicon, titanium, or the like can be useful as inorganic binder agents.

As used herein, "inorganic bonding medium" refers to a material which serves as filler material or as a matrix in which diamond particles are dispersed. Typically, the bonding medium can chemically bond with the binder agent and/or diamond particles, although some mechanical bonding is often also present. Non-limiting examples of suitable bonding medium materials can include cubic boron nitride, tungsten carbide, boron, silicon nitride, and the like.

As used herein, "vacuum" refers to a pressure condition of less than $10^{-2}$ torr.

As used herein, "metallic" refers to a metal, or an alloy of two or more metals. A wide variety of metallic materials are known to those skilled in the art, such as aluminum, copper, chromium, iron, steel, stainless steel, titanium, tungsten, zinc, zirconium, molybdenum, etc., including alloys and compounds thereof.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As a non-limiting example of this principle, although silicon and boron are listed as inorganic binder agents each has unique properties which may make it more or less suitable in a given circumstance, e.g. silicon can provide much stronger carbide bonding such that brazability and mechanical strength of the TSP grits are improved over use of boron alone. It is not the purpose of this specification to exhaustively outline every possible distinction among potentially useful components, but rather to illustrate the principles of the present invention, often with the use of such lists.

As a point of reference, volume and weight percents are carefully used throughout the specification and are distinct from one another. Further, volume percents are calculated to exclude void space and interstitial space in a material or between particles. For example, a quantity of 100 wt % diamond would have less than 100 vol % diamond due to interstitial voids. The actual deviation between weight and volume percents will, of course, vary depending on the particle size and other components of the composition.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 micron to about 5 microns" should be interpreted to include not only the explicitly recited values of about 1 micron to about 5 microns, but also include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

The Invention

The present invention as described herein allows for a number of achievements in the area of polycrystalline grits. For example, production of a thermally stable grit product that is relatively newer in microstructure having improved mechanical properties can be achieved. Second, improved control of product shape for better performance can be readily obtained. Third, a larger size product which can be produced at competitive prices can be realized. The improved price competitiveness comes from both a shorter HPHT cycle and a higher yield of desired shapes and sizes as compared to the low yield and laborious crushing operation of conventional finished TSP bodies.

In accordance with one embodiment of the present invention, a uniquely designed diamond particulate powder feed charge can be prepared. The particulate feed charge can include a substantially homogenous mixture of diamond, inorganic bonding medium, and an inorganic binder agent. Forming a substantially homogenous mixture of these components can reduce the HPHT processing time and improve the homogeneity of the final product. Further, problems associated with conventional infiltration, or sweeping methods, can be avoided such that very fine particles can be used without sacrificing product quality.

The diamond content of the particulate feed charge can be from about 30 vol % to about 95 vol %, and preferably from about 50 vol % to about 90 vol %. Although in some cases it can be desirable to form a composite material as described more fully below where the diamond content of the final product is from about 10 vol % to about 50 vol % and the bulk of the TSP grit comprises a bonding medium material such as tungsten carbide. The diamond particles can have almost any useful size. Typically, the diamond particles can have a size from about 0.5 μm to about 500 μm, and preferably from about 1 μm to about 100 μm, although other sizes can also be used.

In an additional aspect, the inorganic bonding medium can be any material which provides sufficient hardness and acts as a medium for bonding of the diamond particles in fixed positions relative to one another. Non-limiting examples of suitable inorganic bonding medium materials can comprise, or consist essentially of, cubic boron nitride, boron, silicon nitride, tungsten carbide, tantalum carbide, and combinations thereof.

Typically, the inorganic bonding medium can be present in the particulate feed charge from about 1 vol % to about 20 vol %, and preferably from about 2 vol % to about 10 vol %. In one specific embodiment, the inorganic bonding medium can be cubic boron nitride which is present in the particulate feed charge at a content from about 1 vol % to about 5 vol %. Although any suitable particle size can be used, the inorganic bonding medium can typically have a size from about 0.5 μm to about 20 μm.

Alternatively, as mentioned above, the inorganic bonding medium can be present in a much higher content. Thus, in some cases, the inorganic bonding medium can be from about 50 vol % to about 90 vol %. In one preferred aspect of this embodiment, the inorganic bonding medium can be tungsten carbide.

In accordance with another aspect of the present invention, the inorganic binder agent can be any material which is capable of improving the binding between diamond and/or bonding medium. Suitable inorganic binder agents can include, but are not limited to, silicon, titanium, rhenium, nickel, tungsten, molybdenum, niobium, vanadium, chromium, manganese, and compounds or alloys thereof. In one optional embodiment, the inorganic binder agent can be cobalt. Typically, cobalt is used only in those embodiments where the diamond content is below 50 vol %. In this case, the cobalt acts more as a binder rather than a sintering aid. Generally, the inorganic binder agent can comprise from about 1 vol % to about 60 vol %, although 10 vol % to about 40 vol % is most typical.

In one currently preferred aspect, the particulate feed charge can include diamond, cubic boron nitride, silicon, and boron. In another currently preferred embodiment, the particulate feed charge can further include titanium.

The particulate feed charge can further optionally include a brazable metal binder which allows the final product TSP material to be readily brazed to a tool substrate. Typically, the brazable metal binder can include a carbide former such as, but not limited to, tungsten carbide, tantalum carbide, cobalt, nickel, molybdenum, chromium, tantalum, titanium, and the like.

Although the powdered charge materials described above are considered unique, the present invention can also be used in connection with more conventional thermally stable materials such as, but not limited to, acid leached polycrystalline PCD, nonporous silicon bonded PCD, or the like.

The particulate feed charge can be placed into the shaped openings of a partition member to form a charged partition. Referring now to FIG. 1, the partition member 10 can be prepared using any number of techniques and materials. The partition member can have a plurality of shaped openings 12 corresponding to a predetermined grit shape. The shaped openings shown in FIG. 1 are shown having tapered upper ends 14, however this is an optional aspect. The tapered shape can allow for additional compaction of the particulate feed charge during processing. However, this also illustrates an additional aspect that the openings do not necessarily have a uniform cross section. For example, grits having a variety of shapes can be formed such as conical, pyramidal, contoured, or the like. Generally, almost any useful grit shape can be produced using the partition members of the present invention. Several non-limiting examples of suitable predetermined grit shapes can include hexagonal block, cubic, cylindrical, star, needle, multi-lobe fracturable grit, and combinations thereof.

In one aspect, the predetermined grit shape can be a multi-lobe fracturable grit. The multi-lobe fracturable grit can be configured to include lobes or portions which have constricted smaller areas which allow the mass to be readily fractured into smaller pieces. In one aspect, the multi-lobe fracturable grit can have a clover-leaf pattern having four or five lobes. Alternatively, the multi-lobe fracturable grit can have two lobes or a chain of lobes in series.

Figure 2A:
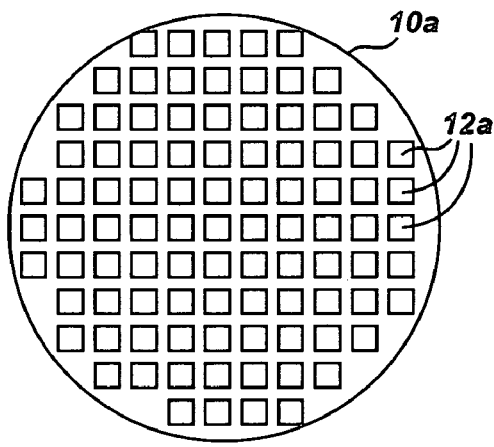
FIG. 2A is a top view of a partition member having cubic openings in accordance with one embodiment of the present invention.
Figure 2B:
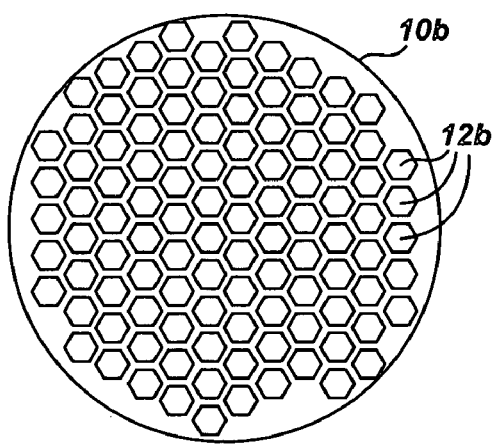
FIG. 2B is a top view of a partition member having hexagonal openings in accordance with one embodiment of the present invention.
Figure 2C:
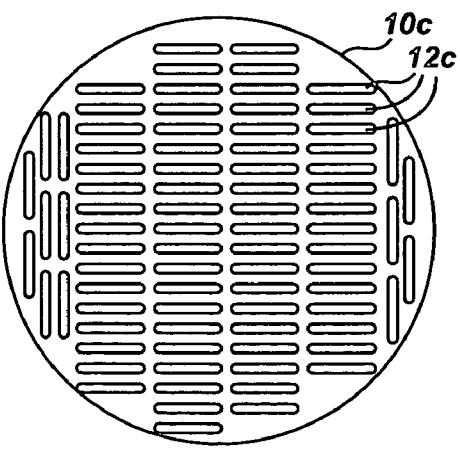
FIG. 2C is a top view of a partition member having needle openings in accordance with another embodiment of the present invention.
Figure 2D:
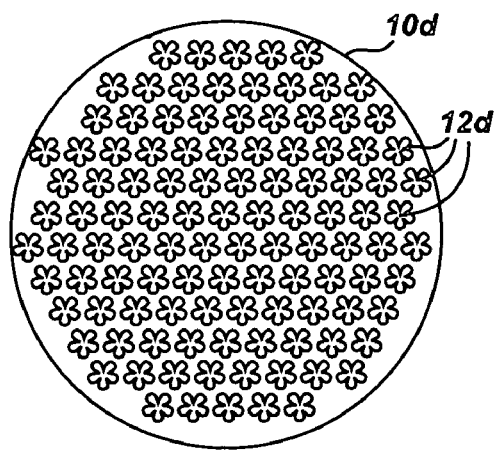
FIG. 2D is a top view of a partition member having five-lobe fracturable openings in accordance with still another embodiment of the present invention.

Referring now to FIG. 2A, a partition member 10a is shown having square shaped openings 12a for use in production of cubic or block shaped grits, depending on the depth of the shaped openings compared to the width. Similarly, FIG. 2B illustrates a partition member 10b having hexagonal shaped openings 12b. FIG. 2C illustrates a partition member 10c having needle shaped openings 12c. FIG. 2D illustrates a partition member 10d having five-lobe fracturable shaped openings 12d.

Thus, the shape of cavity can be regular as well as irregular like elongated, needle, shallow, and spherical shapes can be provided. Regardless of the specific openings, the partition member can be formed using powder compaction, extrusion forming, machining processes, or the like. For example, either gasket/ceramic powder or graphite powder as a raw material powder can be used to form the partition member from the cold compression process or machining of a flat disc. The cavity of desirable pattern can be either machined on the original disc or pressed fit in situ as part of an extrusion process of an original disc. The pressed partition member can be properly heat treated for both strength and impurity removal prior to a loading of mixed diamond and catalyst materials to complete the reaction cup assembly. In one alternative aspect, the shaped openings of the partition member extend completely through the partition member. In accordance with one embodiment of the present invention, a preshaped honeycomb form of a compressed pallet can be made by compression tooling with ceramic like alumina or graphite powder first. Any suitable material can be used in forming the partition member. Typically, a material that does not participate or interfere with formation of the TSP grits can be useful. Non-limiting examples of suitable materials for use in the partition member can include graphite, hexagonal boron nitride, alumina, steel, and composites or alloys thereof.

Figure 3:
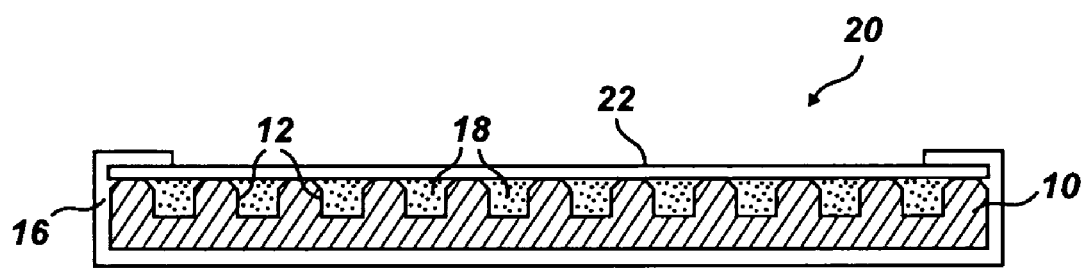
FIG. 3 shows a side cross-sectional view of a charged partition placed in a crimped tantalum cup in accordance with an embodiment of the present invention.

The partition member 12 can be loaded into an HPHT reaction-cup 16 as shown in FIG. 3. The particulate feed charge 18 can be loaded inside the cavities or openings 12 of the partition member to form a charged partition 20. The reaction cup assembly of a tantalum cup and partition member disc can also produced by providing a honeycomb shape disc having holes and cavities made with carbon and silicon reactive-free material that is filled with diamond feed powder as shown in FIG. 3. A plate or disc such as a molybdenum disc 22 can be placed on top of the partition member and the edges of the cup 16 crimped to retain the contents.

Figure 4:
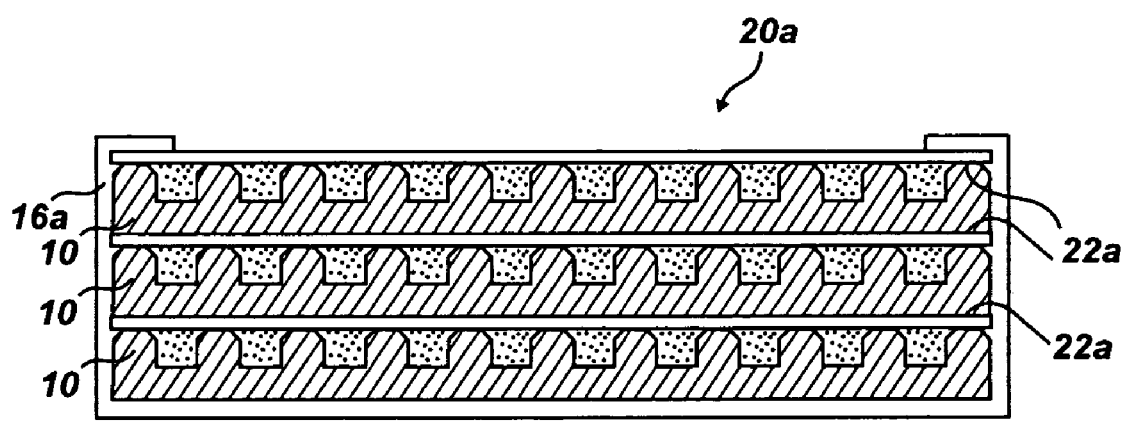
FIG. 4 shows a side cross-sectional view of multiple charged partitions placed in a crimped tantalum cup in accordance with another embodiment of the present invention.

Referring now to FIG. 4, a multi-layered reaction cell assembly 20a can be formed. Partition members 10 can be placed in a taller cup 1 6a by loading the openings with particulate feed charge into each disc. A partition layer 22a can be placed over each partition member to substantially cover the particulate feed charge and the process repeated to form a desired number of layers.

Figure 5:
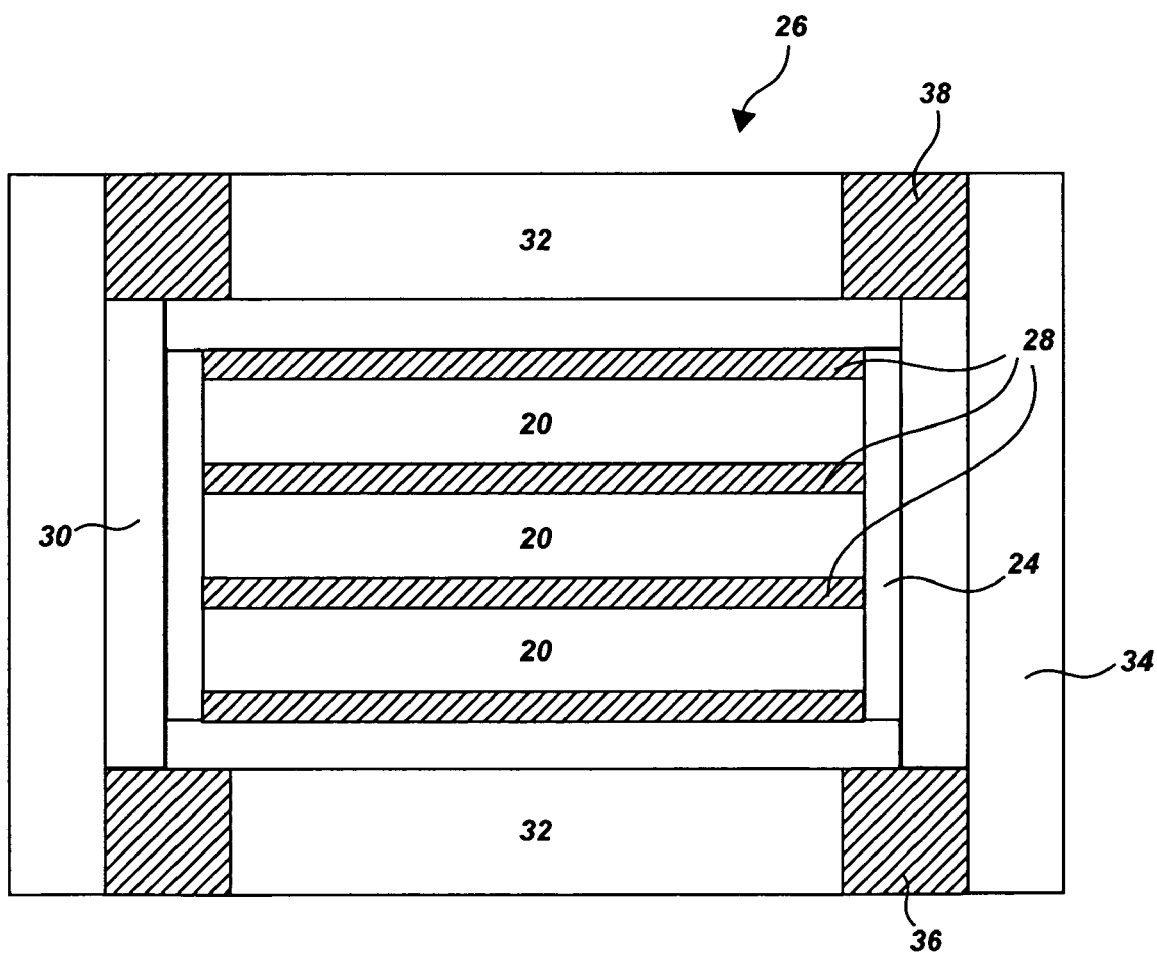
FIG. 5 is a side cross-sectional view of an HPHT synthesis cell having multiple charged partitions in accordance with one embodiment of the present invention.

One or more charged partition assemblies 20 can be assembled into the sleeve 24 of an inner cell assembly of an HPHT cell 26 as shown in FIG. 5. The complete reaction-cup assembly 20 can be loaded up with either one loaded partition disc or several charged partitions within each assembly as in FIG. 4. Typically, the sleeve can be hBN, graphite, alumina or other suitable materials. HPHT cell can include additional layers such as partitioning discs 28 which can be formed of materials such as hBN, graphite, salt, mica, or the like. A graphite heater 30 can be used to control temperature. Additional gasket materials 32 and 34 can steel rings 36 and 38 can also be included as part of the outer layers of the HPHT cell. Other configurations can be used by those skilled in the art and the present invention is not limited to the HPHT cell illustrated and discussed in connection with FIG. 5.

The HPHT cell containing the charged partition can be subjected to a high temperature and a high pressure for a time sufficient to form thermally stable polycrystalline grits of the particulate feed charge. Any suitable HPHT apparatus can be used such as, but not limited to, piston-cylinder, multi-anvils, belt devices, and any other suitable high pressure press. In accordance with the present invention the time can be from about 1 minute to about 10 minutes, although other times may be useful. The particulate feed charge of the present invention allows for significantly reduced process times. Additionally, the process temperature and pressure can be any that is sufficient to form TSP diamond grits in accordance with the present invention. Although these variables can change depending on the specific composition and particle sizes, typically, the temperature can be from about 1350° C. to about 1450° C. and the pressure can be from about 45 Kb to about 55 Kb.

The as-pressed TSP grit product can be recovered from the HPHT press after the high pressure-high temperature cycle and individual TSP grits are either readily recovered from the reaction cups by tapping or a weak acid treatment to loosen the particles from the surrounding layers, depending on the degree of interlocking between grits in the partition disc. The recovered TSP grits can have the predetermined shape based on the partition configuration. Several examples of currently preferred shapes are shown in FIGS. 6A through 6F as cubes, hexagonal blocks, multi-lobe fracturable grit (shown whole 40 and fractured 42), needles, cylinders, and chain-like, respectively.

Thus, the grits formed by the present invention typically do not need any additional cutting to form a desired useful shape. Additional cutting, polishing or other steps add extra cost and time to manufacturing. Therefore, one beneficial aspect of the present invention is the improved ability to prepare thermally stable polycrystalline grits having a predetermined shape which do not require post-processing subsequent to recovery from the reaction cell.

Although almost any size and shape material or grit can be formed using the methods of the present invention, the thermally stable polycrystalline grit can have a mesh size from about 100 mesh to about 15 mesh, and preferably from about 60 mesh to about 20 mesh.

The TSP grits of the present invention are particularly suited in a specific application such as gravel aggregated concrete grinding and polishing. This area of industry is currently experiencing an escalation in demand and scale. For this particular application, conventional diamond grits such as 30/40 to 40/50 mesh synthetic diamond grits or 30/40 natural diamond grits are not suitable to the requirement of this industry due at least in part to its unbalanced strength of grit, lower thermal stability for the high temperature bonding (above 1050 degrees Celsius), limited availability, and poor shape and size quality.

The following are examples illustrate various methods of making thermally stable polycrystalline grits in accordance with the present invention. However, it is to be understood that the following are only exemplary or illustrative of the application of the principles of the present invention. Numerous modifications and alternative compositions, methods, and systems can be devised by those skilled in the art without departing from the spirit and scope of the present invention. The appended claims are intended to cover such modifications and arrangements. Thus, while the present invention has been described above with particularity, the following Examples provide further detail in connection with several specific embodiments of the invention.

EXAMPLE 1

A diamond feed was prepared by mixing diamond having an average size of 25-45 microns, CBN powder of average size of 3 microns, silicon powder of average size of 5 microns, boron powder of average size of 1 micron, and titanium powder of average size of 2 microns in a content ratio of 80:3:12:2:3 wt %. At the same time, a reaction-cup assembly and the associated parts were also prepared such as honeycomb discs (similar to FIG. 2B), molybdenum discs, graphite discs, and a tantalum cup. The honeycomb disc was made with graphite and was first loaded into a bottom of the tantalum cup. Diamond feed was filled into the cavity and a moly disc, graphite disc, and a moly disc were loaded, respectively. Subsequently, another honeycomb graphite disc followed by diamond feed loading and loading of one moly disc, one graphite disc, and another moly disc were loaded in order. Another set of honeycomb graphite disc, diamond, moly disc, graphite disc, and a moly disc were loaded before crimping the cup to close it.

The loaded reaction-cup assembly was assembled in a typical HPHT reaction cell and this cell was placed in a conventional HPHT hydraulic press. The pressure was raised to about 50 Kb and then the temperature was elevated to around 1400° C. After being maintained for about 3 minutes, the temperature was lowered and the pressure was gradually reduced. The resulting consolidated disc of multiple TSP grits was recovered from the cell.

Figure 6A:
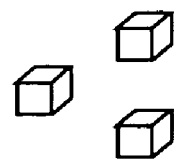
FIGS. 6A through 6F are perspective views of several different TSP grits formed in accordance with embodiments of the present invention.
Figure 6B:
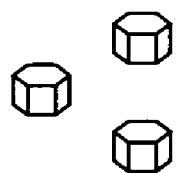

The individual grits were recovered from the graphite disc by separating or breaking apart. Some of the pieces were not easily separated from the disc and a slight acid treatment was needed in order to etch away the metal layer left over in between the grits. The individual grits were hexagonal blocks such as shown in FIG. 6B and the size appears to be about 10 mesh and appears to be good quality and were typical shiny looking grey color TSP grits.

EXAMPLE 2

The test of Example 1 was repeated with a honeycomb disc that is made out of ceramic material. The honeycomb disc with elongated circular holes was prepared by slicing an extruded alumina disc with circular holes. The diamond feed composition was prepared at a different weight ratio from Example 1. Specifically, the weight ratio of diamond:CBN:Si:B:Ni was 70:2:20:3:5 wt %. Similar elongated TSP grits were obtained (similar to FIG. 6D) and their microstructure was quite normal and a simple tool test indicated normal properties meeting standard TSP quality.

EXAMPLE 3

With the same type of diamond feed material prepared from mixed powder of diamond, CBN, silicon, titanium, boron as described in Example 1, the round and thin (about 3 mm thick) graphite discs with a cavity of different shape patterns like needle like, continuous chain-like, and a flower pattern was prepared. This patterned graphite disc was first loaded into the tantalum cup and diamond feed was then loaded into the cavity and the cup was crimped closed. Another cup was loaded with patterned graphite disc and diamond feed was loaded, but this cup had one additional graphite disc to have two layers of diamond loaded disc inside the same cup. Both cups were assembled into the standard HPHT cell for HPHT processing.

Figure 6C:
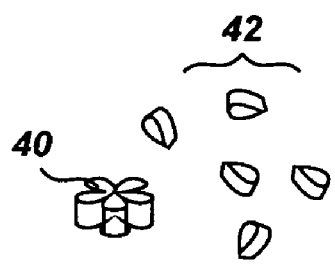
Figure 6D:
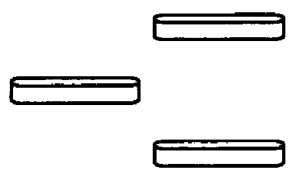
Figure 6E:
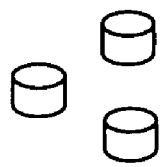
Figure 6F:
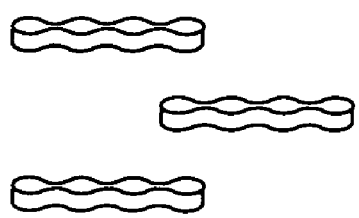

After the HPHT processing under the short pressing cycle time, two cups were recovered from the cell and many individually shaped TSP materials were also recovered from the graphite disc without difficulty having shapes similar to those shown in FIGS. 6C, 6D, and 6F. For testing purpose, the chain like elongated TSP fracturable grits were then crushed in a standard Zet-type mill crusher. It was learned that the recovered crushed parts were much more easily crushed into the shape which it was originally designed and more importantly, it appears that the crushing efficiency with minimal small crushed debris for the desirable size and shape is much better than conventional crushed TSP.

The crushing efficiency can be further improved by adjusting the graphite disc partition member thickness and a desirable pattern which are not that difficult to prepare by either machining or forming processes.

EXAMPLE 4

Another form of thermally stable PCD was prepared with a feed material in accordance with another aspect of the present invention. A mixture of diamond powders, tungsten carbide powder, and cobalt powder was prepared such that diamond grains were dispersed in a matrix of tungsten carbide and cobalt. This experiment was aimed for the evaluation of TSP grits for both its thermal stability and brazability to a steel body.

Diamond of 2 to 3 micron powder was mixed with tungsten carbide (average 1 micron) and cobalt powder (average 2 microns) by a weight ratio of 13:79:6 and the balance is various carbides like vanadium, tantalum, titanium, and molybdenum carbides. This mixed powder was ball milled for 24 hours in a tungsten carbide mill using tungsten carbide balls in a medium of methyl alcohol. The ball milled powder was treated under high temperature firing at 900 degrees Celsius in hydrogen gas atmosphere.

Both solid type PCD and tungsten carbide substrated PCD were fabricated per typical HPHT PCD sintering conditions except for a short process time (no more than 5 minutes) and relatively lower pressure (around $\frac{2}{3}$ of normal high pressure of 45 Kb). Again, solid PCD was optionally obtained in the form of both standard disc type of 34 mm diameter×3.2 mm thick and shaped form of TSP grits as a triangle block of 60 degrees with a leg length of 5.0 mm from a ceramic or hBN pallet of shaped cavities as in previous example. Additional forms of cubic and sphere shape grits were also pressed under the above HPHT conditions and pressed parts were obtained as shaped grits that look normal.

Both solid and substrated TSP grits appear similar to standard PCD but have properties which are different from normal PCD. For example, increased toughness grade PCD even with lower wear resistance is realized. The wire EDM cut segments of tungsten carbide substrated PCD were then attached in a special grinding plate and tested in a concrete grinding application where tougher property is critical over higher wear resistance of standard grade PCD. The new TSP grits worked better from this particular test than standard PCD with no massive cracking shown.

A brazing test was also conducted using this solid type TSP grit to braze them onto a steel body using a commercially available Easyflow-45 brazing alloy at about 600 degrees Celsius. Overall, the brazing joint looks acceptable although it turns out to be a bit weaker at the bond interface based on knocking-off test. The brazeability of this TSP grit can be improved with a PCD surface having lower diamond concentration and more metal matrices of PCD, e.g., including higher content of brazable metal binder. The composition of this particular thermally stable and brazable PCD has a diamond concentration in between 10 vol % to around 60 vol % and the balance would be stable carbides like mainly WC with a trace of TaC, TiC, VC, Mo2C, and a relatively small amount (3 to 15 vol %) of cobalt.

EXAMPLE 5

As a continuation of Example 4, the solid form of TSP grit in Example 4 was coated with TiN using a typical physical vapor deposition method. The coated TSP grits were subjected to the same brazing test and this time the bond strength appeared to be much improved. Similarly, TiC coating was also tried in the same manner and its bond strength at the brazing joint was also as good as the TiN coated TSP grit. Again, the standard titanium coating was also conducted with the solid TSP grit and the same brazing test performed. The strength was confirmed to be as good as the other sample tests. Other brazable carbide or nitride forming materials can also be coated on the recovered TSP grits to improve brazability to various tool substrates.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of making shaped thermally stable polycrystalline diamond material, comprising the steps of:
   a) preparing a partition member having a plurality of shaped openings corresponding to a predetermined shape;
   b) placing a particulate feed charge into the shaped openings to form a charged partition, said particulate feed charge including a substantially homogenous mixture of diamond, inorganic bonding medium, and an inorganic binder agent; and
   c) subjecting the charged partition to a high temperature and a high pressure for a time sufficient to form thermally stable polycrystalline material of the particulate feed charge, wherein said thermally stable polycrystalline material is bonded together primarily by cementing adjacent particles via a secondary material rather than by sintering.

2. The method of claim 1, wherein the partition member comprises a material selected from the group consisting of graphite, hexagonal boron nitride, alumina, steel, and composites or alloys thereof.

3. The method of claim 1, wherein the shaped openings of the partition member extend completely through the partition member.

4. The method of claim 1, wherein the predetermined shape is a member selected from the group consisting of hexagonal block, cubic, cylindrical, star, needle, pyramidal, multi-lobe fracturable grit shape and combinations thereof.

5. The method of claim 4, wherein the predetermined shape is a multi-lobe fracturable grit shape.

6. The method of claim 5, further comprising the step of fracturing the multi-lobe grit to form a plurality of shaped grits shape.

7. The method of claim 1, wherein the particulate feed charge has a diamond content from about 30 vol % to about 95 vol %.

8. The method of claim 1, wherein the inorganic bonding medium comprises a member selected from the group consisting of cubic boron nitride, boron, silicon nitride, tungsten carbide, and combinations thereof.

9. The method of claim 8, wherein the inorganic bonding medium is cubic boron nitride and the particulate feed charge has a cubic boron nitride content from about 1 vol % to about 5 vol %.

10. The method of claim 1, wherein the inorganic bonding medium is tungsten carbide and the particulate feed charge has a tungsten carbide content from about 50 vol % to about 90 vol %.

11. The method of claim 1, wherein the inorganic binder agent is selected from the group consisting of silicon, titanium, rhenium, nickel, tungsten, molybdenum, niobium, vanadium, chromium, manganese, and compounds or alloys thereof.

12. The method of claim 1, wherein the particulate feed charge comprises diamond, cubic boron nitride, silicon, and boron.

13. The method of claim 1, wherein the particulate feed further comprises a brazable metal binder which is a carbide former.

14. The method of claim 1, wherein the time is from about 1 minute to about 10 minutes.

15. The method of claim 1, wherein the temperature is from about 1350° C. to about 1450° C. and the pressure is from about 45 Kb to about 55 Kb.

16. The method of claim 1, further comprising the step of placing the partition member in a reaction cup prior to placing the particulate feed charge therein to form a reaction cup assembly.

17. The method of claim 16, further comprising the steps of:
   a) placing at least one partition layer over the partition member such that the particulate feed charge is substantially covered; and
   b) forming a second charged partition having a plurality of shaped openings with particulate feed charge therein to form a multi-layered reaction cell.

18. The method of claim 1, further comprising the step of coating the thermally stable polycrystalline material with a brazable carbide or nitride forming material.

19. The method of claim 1, wherein the thermally stable polycrystalline material has a mesh size from about 100 mesh to about 15 mesh.

20. The method of claim 19, wherein the mesh size is from about 60 mesh to about 20 mesh.

21. The method of claim 1, further comprising the step of recovering the thermally stable polycrystalline material from the charged partition subsequent to the step of subjecting so as to form recovered thermally stable polycrystalline grits.

* * * * *